(12) United States Patent
Kostka, Jr. et al.

(10) Patent No.: US 10,317,079 B2
(45) Date of Patent: Jun. 11, 2019

(54) COOLING AN APERTURE BODY OF A COMBUSTOR WALL

(71) Applicant: United Technologies Corporation, Farmington, CT (US)

(72) Inventors: Stanislav Kostka, Jr., Shrewsbury, MA (US); Frank J. Cunha, Avon, CT (US)

(73) Assignee: United Technologies Corporation, Farmington, CT (US)

( * ) Notice: Subject to any disclaimer, the term of this patent is extended or adjusted under 35 U.S.C. 154(b) by 234 days.

(21) Appl. No.: 15/039,071

(22) PCT Filed: Dec. 19, 2014

(86) PCT No.: PCT/US2014/071573
§ 371 (c)(1),
(2) Date: May 25, 2016

(87) PCT Pub. No.: WO2015/147929
PCT Pub. Date: Oct. 1, 2015

(65) Prior Publication Data
US 2017/0108220 A1    Apr. 20, 2017

Related U.S. Application Data

(60) Provisional application No. 61/919,225, filed on Dec. 20, 2013.

(51) Int. Cl.
*F23R 3/00* (2006.01)
*F02C 7/12* (2006.01)
*F23R 3/06* (2006.01)

(52) U.S. Cl.
CPC ............... *F23R 3/005* (2013.01); *F02C 7/12* (2013.01); *F23R 3/06* (2013.01); *F23R 2900/03042* (2013.01)

(58) Field of Classification Search
CPC .. F23R 3/002; F23R 3/04; F23R 3/045; F23R 3/06; F23R 3/02
See application file for complete search history.

(56) References Cited

U.S. PATENT DOCUMENTS

| | | |
|---|---|---|
| 4,132,066 A | 1/1979 | Austin et al. |
| 4,622,821 A | 11/1986 | Madden |
| 4,653,279 A | 3/1987 | Reynolds |

(Continued)

FOREIGN PATENT DOCUMENTS

EP    2639508 A2    9/2013

OTHER PUBLICATIONS

Extended EP Search Report dated Dec. 20, 2016.
EPO Official Letter dated Jan. 17, 2019 for EP Application No. 14887292.2.

*Primary Examiner* — Arun Goyal
*Assistant Examiner* — Stephanie Cheng
(74) *Attorney, Agent, or Firm* — O'Shea Getz P.C.

(57) ABSTRACT

An assembly is provided for a turbine engine. This turbine engine assembly includes a combustor wall, which includes a shell, a heat shield and an annular body. The body at least partially defines a first aperture through the shell and the heat shield. The body also defines one or more second apertures through which air is directed into the first aperture and provides non-uniform cooling to the body.

18 Claims, 18 Drawing Sheets

(56) References Cited

U.S. PATENT DOCUMENTS

| | | | |
|---|---|---|---|
| 4,820,097 A * | 4/1989 | Maeda | F02K 1/80 |
| | | | 165/134.1 |
| 5,758,503 A * | 6/1998 | DuBell | F23R 3/002 |
| | | | 60/752 |
| 6,606,861 B2 * | 8/2003 | Snyder | F23R 3/002 |
| | | | 60/752 |
| 7,631,502 B2 | 12/2009 | Burd | |
| 9,151,500 B2 * | 10/2015 | Chen | F23R 3/04 |
| 9,284,888 B2 * | 3/2016 | Romig | F02C 7/22 |
| 2002/0189260 A1 | 12/2002 | David et al. | |
| 2003/0182942 A1 | 10/2003 | Gerendas | |
| 2010/0212324 A1 * | 8/2010 | Bronson | F02C 7/264 |
| | | | 60/752 |
| 2010/0287941 A1 | 12/2010 | Won-Wook | |
| 2011/0120132 A1 | 5/2011 | Rudrapatna et al. | |
| 2012/0297778 A1 | 11/2012 | Rudrapatna et al. | |
| 2013/0025288 A1 | 1/2013 | Cunha et al. | |
| 2013/0340437 A1 | 6/2013 | Erbas-Sen | |
| 2013/0255269 A1 | 10/2013 | McKenzie et al. | |
| 2014/0083112 A1 | 3/2014 | Jause | |

* cited by examiner

COOLING AN APERTURE BODY OF A COMBUSTOR WALL

CROSS-REFERENCE TO RELATED APPLICATION

This application claims priority to PCT Patent Application No. PCT/US14/071573 filed Dec. 19, 2014, which claims priority to U.S. Provisional Patent Appln. No. 61/919,225 filed Dec. 20, 2013, which are hereby incorporated herein by reference in their entireties.

BACKGROUND OF THE INVENTION

1. Technical Field

This disclosure relates generally to a turbine engine and, more particularly, to a combustor of a turbine engine.

2. Background Information

A floating wall combustor for a turbine engine typically includes a bulkhead, an inner combustor wall and an outer combustor wall. The bulkhead extends radially between the inner and the outer combustor walls. Each combustor wall includes a shell and a heat shield, which defines a respective radial side of a combustion chamber. Cooling cavities extend radially between the heat shield and the shell. These cooling cavities fluidly couple impingement apertures defined in the shell with effusion apertures defined in the heat shield.

Each combustor wall may also include a plurality of quench aperture grommets located between the shell and the heat shield. Each of the quench aperture grommets defines a respective quench aperture radially through the combustor wall. The quench aperture grommets as well as adjacent portions of the heat shield are typically subject to relatively high temperatures during turbine engine operation, which can induce relatively high thermal stresses within the grommets and the heat shield.

There is a need in the art for an improved turbine engine combustor.

SUMMARY OF THE DISCLOSURE

According to an aspect of the invention, an assembly is provided for a turbine engine. This turbine engine assembly includes a combustor wall. The combustor wall includes a shell, a heat shield and an annular body. The body at least partially defines a first aperture through the shell and the heat shield. The body also defines one or more second apertures through which air is directed into the first aperture and provides non-uniform cooling to the body.

According to another aspect of the invention, a grommet is provided for a turbine engine combustor wall through which a quench aperture vertically extends. The grommet includes an annular body that extends vertically between interior and exterior surfaces and laterally between inner and outer surfaces. The inner surface at least partially defines the quench aperture. The body defines a plurality of cooling apertures that extend through the body to the inner surface, where the body defines a first of the cooling apertures with a different configuration than that of a second of the cooling aperture.

According to another aspect of the invention, another grommet is provided for a turbine engine combustor wall through which a quench aperture vertically extends. The grommet includes an annular body that extends vertically between interior and exterior surfaces and laterally between inner and outer surfaces. The inner surface at least partially defines the quench aperture. The body defines a plurality of cooling apertures that respectively extend through the body to a plurality of outlets in the inner surface. The outlets are disposed around the quench aperture. A first of the outlets is between and adjacent to a second and a third of the outlets. A distance between the first and the second of the outlets is different than a distance between the first and the third of the outlets.

The first aperture may be a quench aperture. Each second aperture may be a cooling aperture.

The body may be operable to direct air through the cooling apertures to non-uniformly cool the body.

The body may define each of the second apertures with a respective path therethrough. A geometry of the path of one of (e.g., the first of) the second apertures may be different than a geometry of the path of another one of (e.g., the second of) the second apertures.

The body may define each of the second apertures with a respective length therethrough. The length of one of (e.g., the first of) the second apertures may be different than the length of another one of (e.g., the second of) the second apertures.

The body may define each of the second apertures with a respective width therewithin. The width of one of (e.g., the first of) the second apertures may be different than the width of another one of (e.g., the second of) the second apertures.

Respective outlets of the second apertures may be disposed around and fluidly coupled with the first aperture. A first of the outlets may be between and adjacent to a second and a third of the outlets. A distance between the first and the second of the outlets may be different than a distance between the first and the third of the outlets.

The body may include an inner surface that at least partially defines the first aperture. At least a portion of one of the one or more second apertures at the inner surface may extend substantially radially relative to a centerline of the first aperture.

The body may include an inner surface that at least partially defines the first aperture. At least a portion of one of the one or more second apertures at the inner surface may extend substantially tangentially relatively to the inner surface.

The body may include an inner surface that at least partially defines the first aperture. At least a portion of one of the one or more second apertures at the inner surface may extend acutely relative to the inner surface.

The body may extend laterally between an outer surface and an inner surface that at least partially defines the first aperture. One of the one or more second apertures may extend through the body between the outer surface and the inner surface.

The body may extend vertically to an exterior surface and laterally to an inner surface that at least partially defines the first aperture. One of the one or more second apertures may extend through the body between the exterior surface and the inner surface.

The exterior surface may be funnel-shaped. The exterior surface may define a portion of the first aperture.

The body may include a shelf surface and an inner surface that partially defines the first aperture. The shelf surface and the inner surface may define a peripheral inner channel in the body.

The body may extend vertically through a cooling cavity, which may be defined vertically between the shell and the heat shield. The cooling cavity may fluidly couple one or more cooling apertures defined in the shell with one or more cooling apertures defined in the heat shield.

The heat shield may include a plurality of panels that are attached to the shell. The body may be connected to one of the panels.

The foregoing features and the operation of the invention will become more apparent in light of the following description and the accompanying drawings.

DETAILED DESCRIPTION OF THE INVENTION

Figure 1:
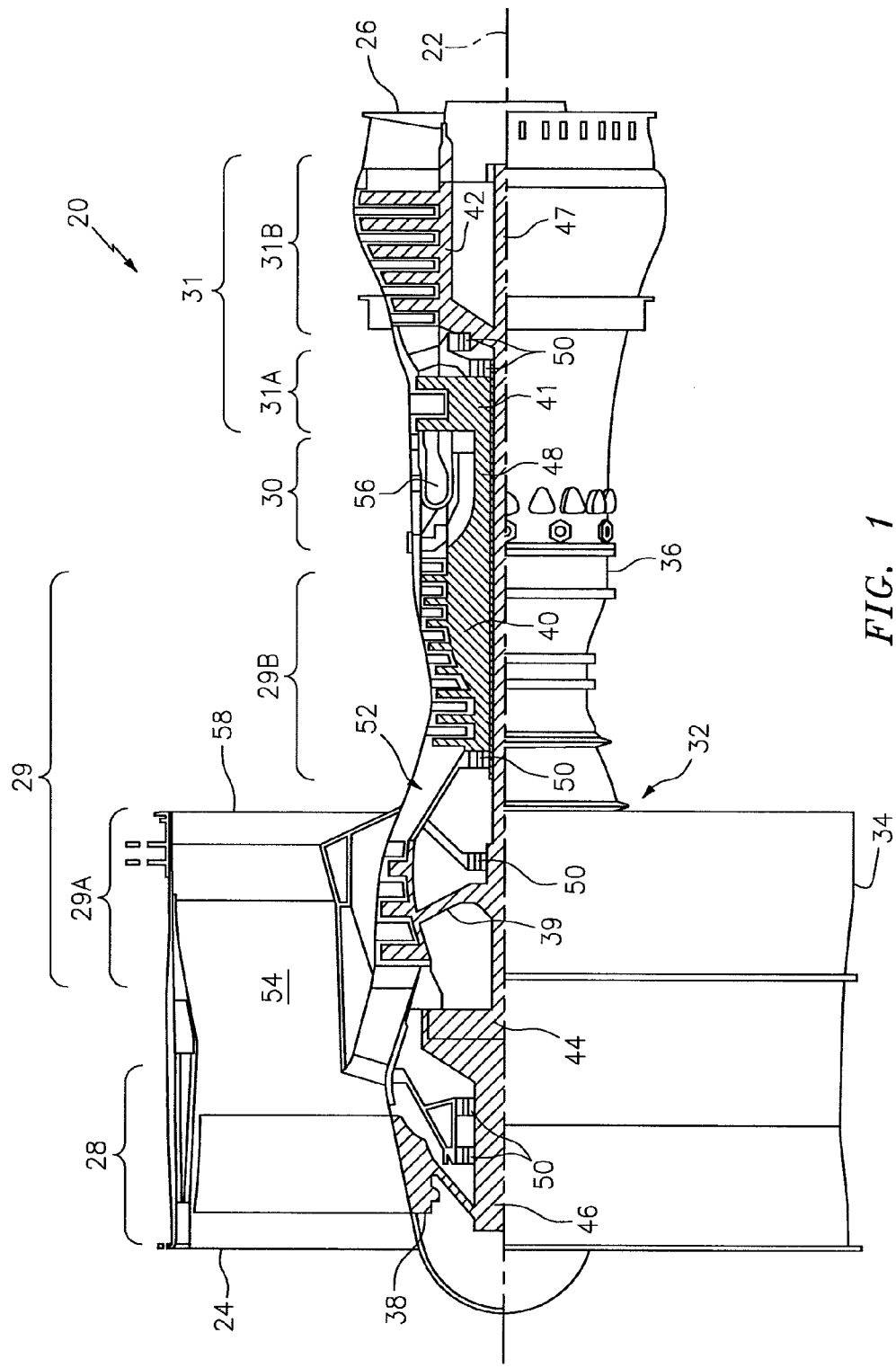
FIG. 1 is a side cutaway illustration of a geared turbine engine.

FIG. 1 is a side cutaway illustration of a geared turbine engine 20. The turbine engine 20 extends along an axial centerline 22 between a forward and upstream airflow inlet 24 and an aft and downstream airflow exhaust 26. The turbine engine 20 includes a fan section 28, a compressor section 29, a combustor section 30 and a turbine section 31. The compressor section 29 includes a low pressure compressor (LPC) section 29A and a high pressure compressor (HPC) section 29B. The turbine section 31 includes a high pressure turbine (HPT) section 31A and a low pressure turbine (LPT) section 31B. The engine sections 28-31 are arranged sequentially along the centerline 22 within an engine housing 32, which includes a first engine case 34 and a second engine case 36.

Each of the engine sections 28, 29A, 29B, 31A and 31B includes a respective rotor 38-42. Each of the rotors 38-42 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 38 is connected to a gear train 44 through a fan shaft 46. The gear train 44 and the LPC rotor 39 are connected to and driven by the LPT rotor 42 through a low speed shaft 47. The HPC rotor 40 is connected to and driven by the HPT rotor 41 through a high speed shaft 48. The shafts 46-48 are rotatably supported by a plurality of bearings 50. Each of the bearings 50 is connected to the second engine case 36 by at least one stationary structure such as, for example, an annular support strut.

Air enters the turbine engine 20 through the airflow inlet 24, and is directed through the fan section 28 and into an annular core gas path 52 and an annular bypass gas path 54. The air within the core gas path 52 may be referred to as "core air". The air within the bypass gas path 54 may be referred to as "bypass air".

The core air is directed through the engine sections 29-31 and exits the turbine engine 20 through the airflow exhaust 26. Within the combustor section 30, fuel is injected into a combustion chamber 56 and mixed with the core air. This fuel-core air mixture is ignited to power the turbine engine 20 and provide forward engine thrust. The bypass air is directed through the bypass gas path 54 and out of the turbine engine 20 through a bypass nozzle 58 to provide additional forward engine thrust. Alternatively, the bypass air may be directed out of the turbine engine 20 through a thrust reverser to provide reverse engine thrust.

Figure 2:
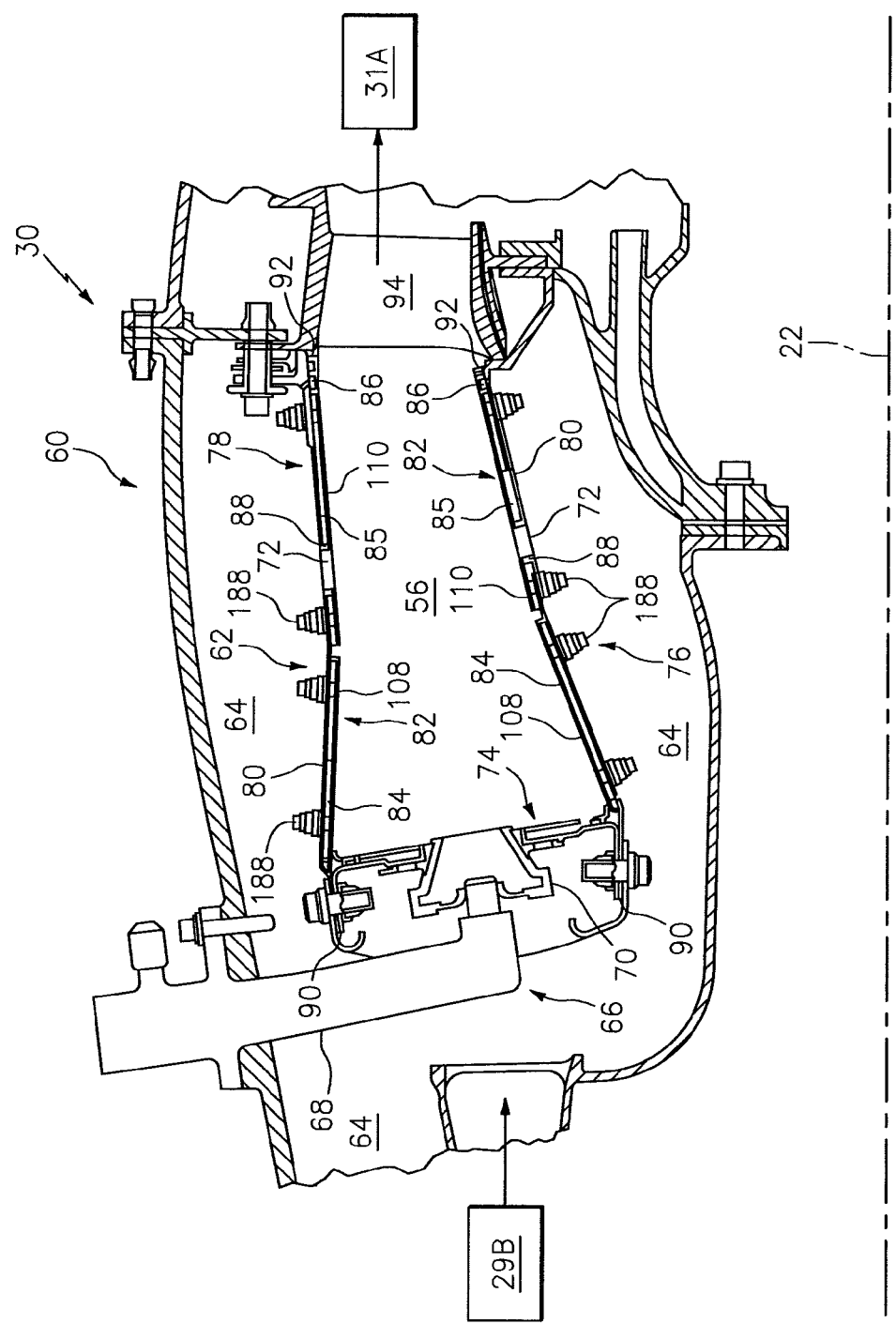
FIG. 2 is a side cutaway illustration of a portion of a combustor section.

FIG. 2 illustrates an assembly 60 of the turbine engine 20. The turbine engine assembly 60 includes a combustor 62 disposed within an annular plenum 64 of the combustor section 30. This plenum 64 receives compressed core air from the HPC section 29B, and provides the received core air to the combustor 62 as described below in further detail.

Figure 3:
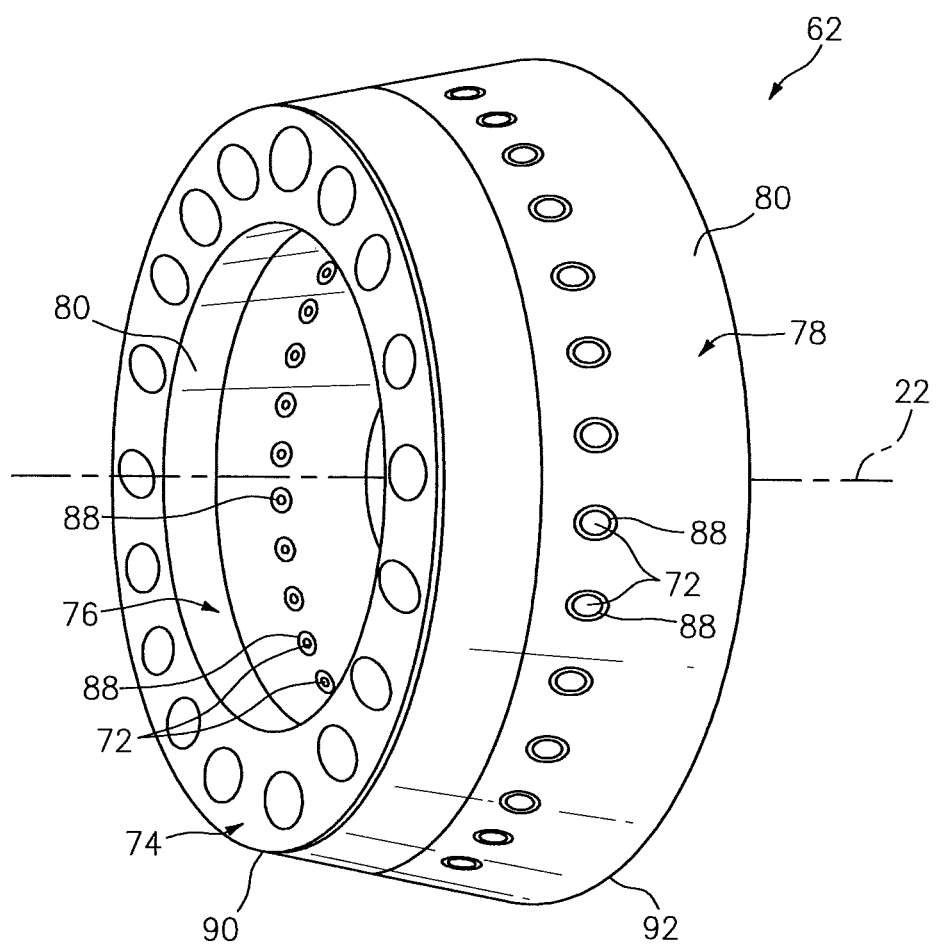
FIG. 3 is a perspective illustration of a portion of a combustor.

The turbine engine assembly 60 also includes one or more fuel injector assemblies 66. Each fuel injector assembly 66 may include a fuel injector 68 mated with a swirler 70. The fuel injector 68 injects the fuel into the combustion chamber 56. The swirler 70 directs some of the core air from the plenum 64 into the combustion chamber 56 in a manner that facilitates mixing the core air with the injected fuel. One or more igniters (not shown) ignite the fuel-core air mixture. Quench apertures 72 (see also FIG. 3) in walls of the combustor 62 direct additional core air into the combustion chamber 56 to quench (e.g., stoichiometrically lean) the ignited fuel-core air mixture.

The combustor 62 may be configured as an annular floating wall combustor. The combustor 62 of FIGS. 2 and 3, for example, includes an annular combustor bulkhead 74, a tubular combustor inner wall 76, and a tubular combustor outer wall 78. The bulkhead 74 extends radially between and is connected to the inner wall 76 and the outer wall 78. The inner wall 76 and the outer wall 78 each extends axially along the centerline 22 from the bulkhead 74 towards the HPT section 31A, thereby defining the combustion chamber 56.

Figure 4:
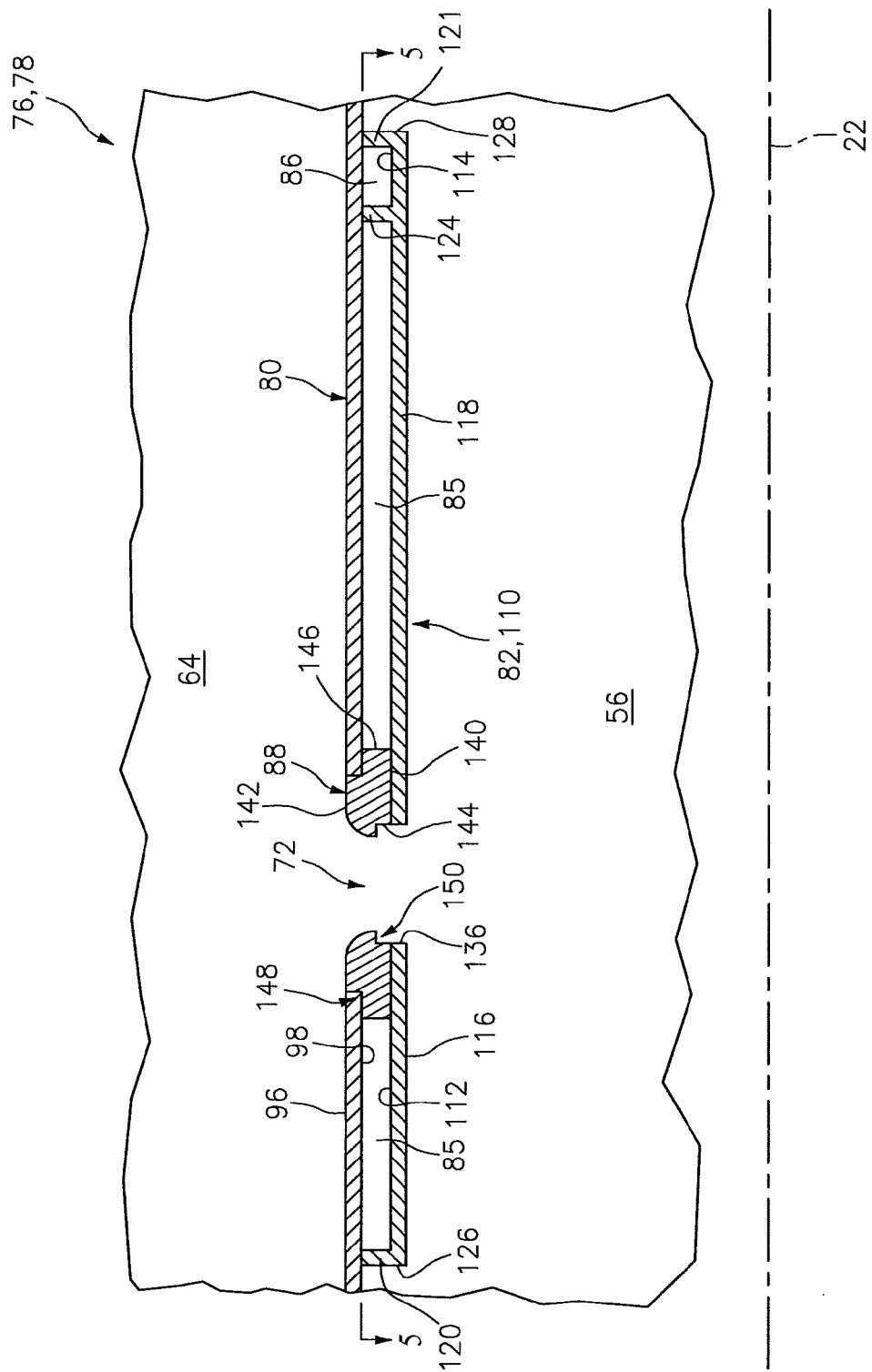
FIG. 4 is a side sectional illustration of a portion of a combustor wall.
Figure 5:
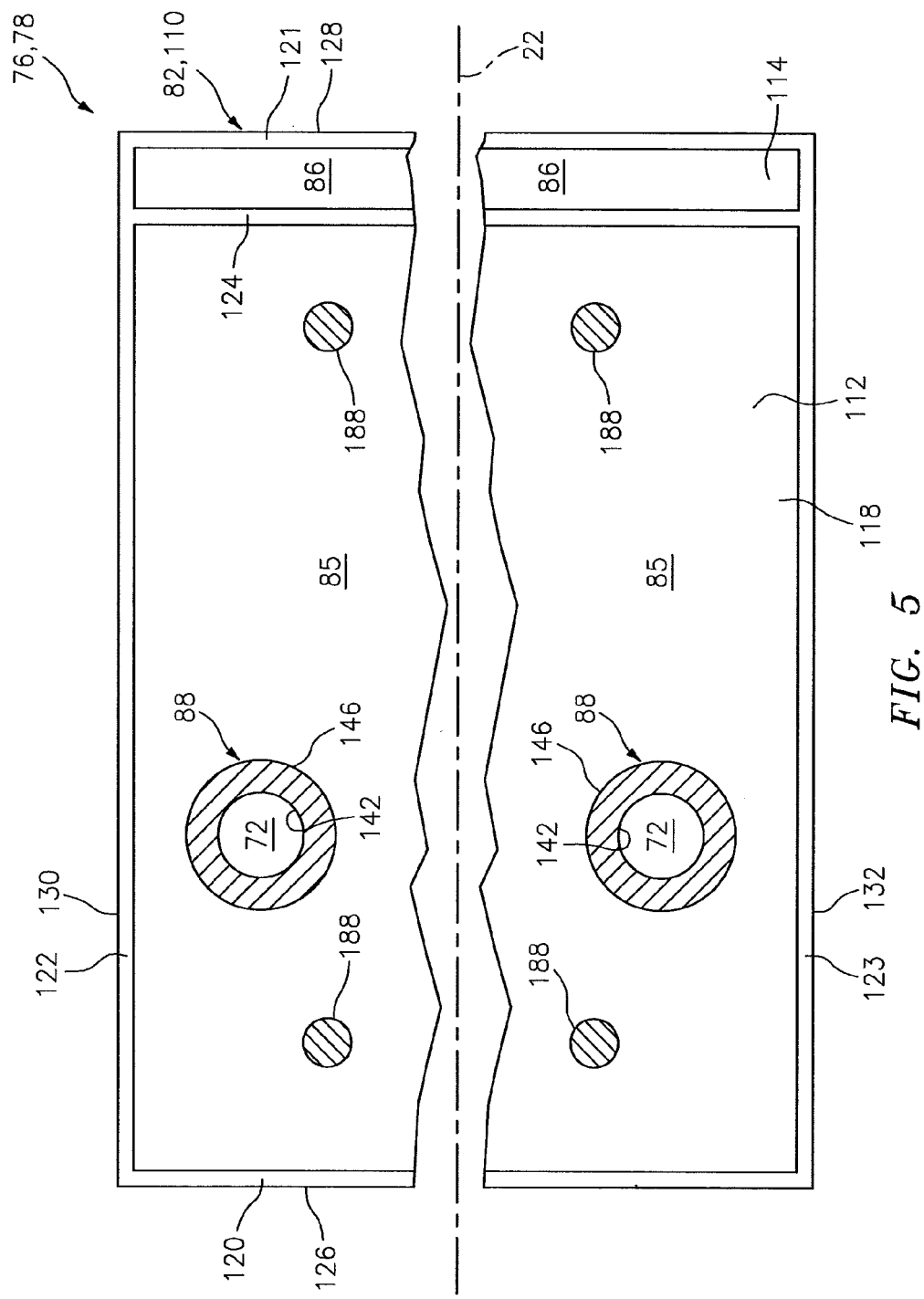
FIG. 5 is a circumferential sectional illustration of a portion of the combustor wall of FIG. 4.
Figure 6:
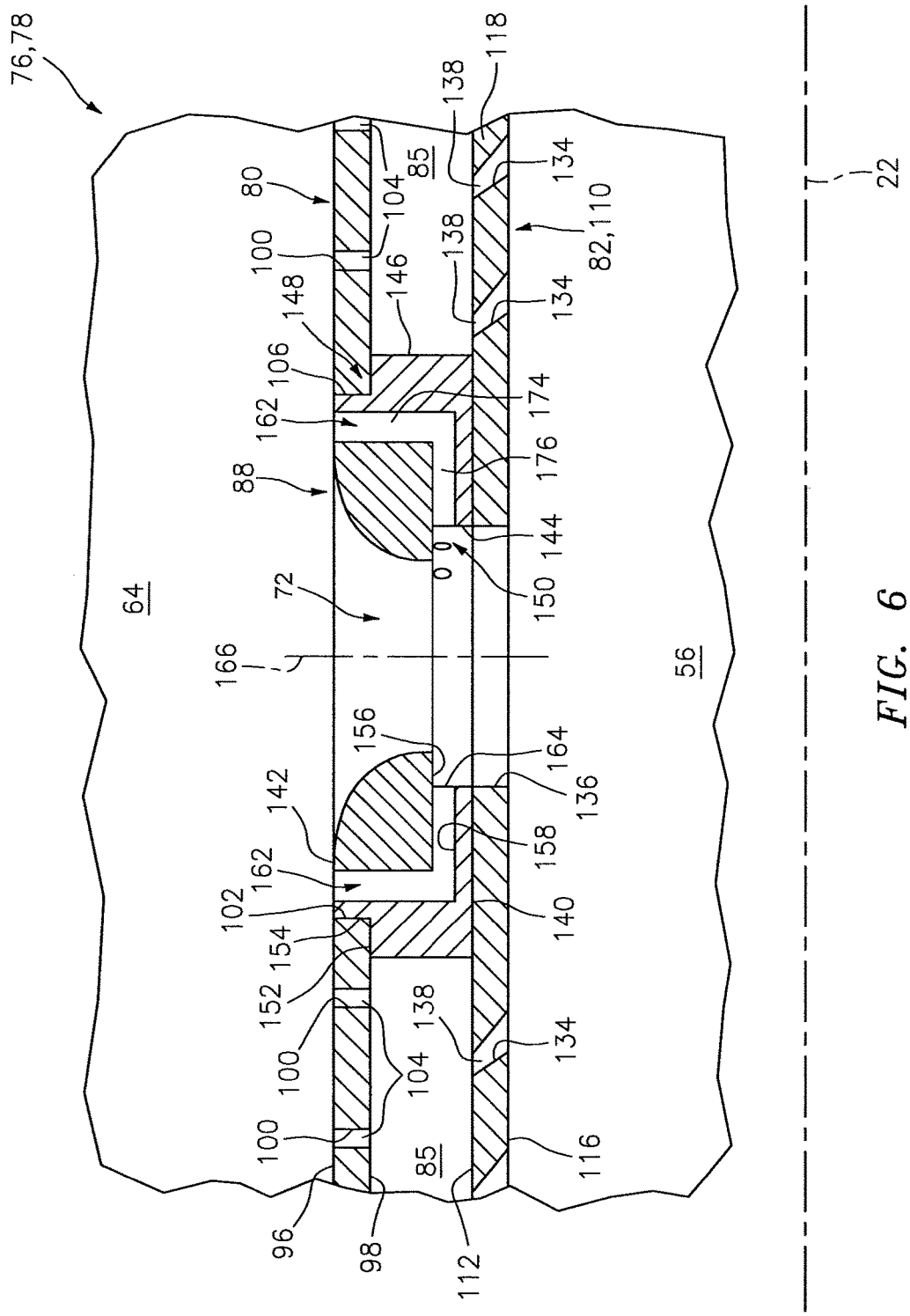
FIG. 6 is a detailed side sectional illustration of a portion of the combustor wall of FIG. 4.
Figure 7:
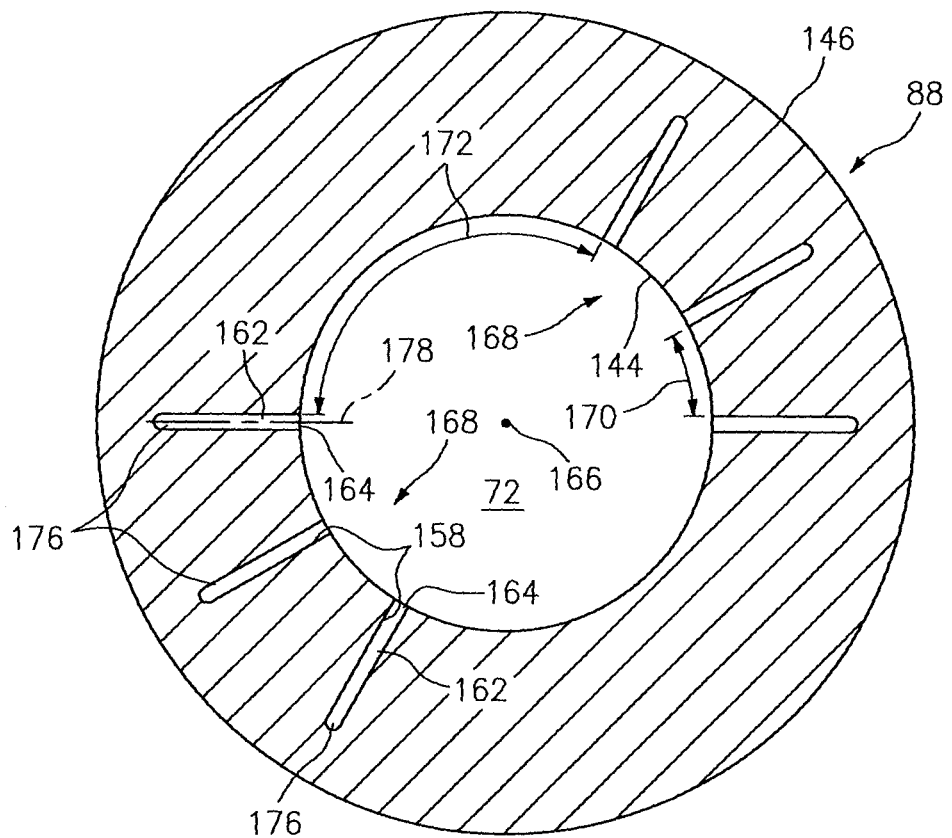
FIG. 7 is a detailed circumferential sectional illustration of an annular body included in the combustor wall of FIG. 6.

FIG. 4 is a side sectional illustration of an exemplary downstream portion of one of the combustor walls 76, 78. FIG. 5 is a circumferential sectional illustration of a portion of the combustor wall 76, 78 of FIG. 4. FIG. 6 is a detailed side sectional illustration of a portion of the combustor wall 76, 78 of FIG. 4. FIG. 7 is a detailed circumferential sectional illustration of an annular body included in the combustor wall 76, 78 of FIG. 6. It should be noted that some details of the combustor wall 76, 78 shown in FIGS. 6 and 7 are not shown in FIGS. 2, 4 and 5 for ease of illustration.

Referring to FIGS. 2 and 4-7, each combustor wall 76, 78 may be configured as a multi-walled structure; e.g., a hollow dual-walled structure. Each combustor wall 76, 78 of FIGS. 2 and 4-7, for example, includes a tubular combustor shell 80, a tubular combustor heat shield 82, and one or more cooling cavities 84-86 (e.g., impingement cavities) between the shell 80 and the heat shield 82. Each combustor wall 76, 78 may also include one or more annular quench aperture bodies 88 (e.g., grommets). These quench aperture bodies 88 are disposed circumferentially around the centerline 22. Each quench aperture body 88 partially or completely defines a respective one of the quench apertures 72 (see also FIG. 3) as described below in further detail.

Referring to FIG. 2, the shell 80 extends circumferentially around the centerline 22. The shell 80 extends axially along the centerline 22 between an axial forward end 90 and an axial aft end 92. The shell 80 is connected to the bulkhead 74 at the forward end 90. The shell 80 may be connected to a stator vane assembly 94 or the HPT section 31A at the aft end 92.

Referring to FIGS. 4 and 6, the shell 80 has an exterior surface 96, an interior surface 98, one or more aperture surfaces 100, and one or more aperture surfaces 102. At least a portion of the shell 80 extends (e.g., radially) between the shell exterior surface 96 and the shell interior surface 98. The shell exterior surface 96, which may also be referred to as a plenum surface, defines a portion of the plenum 64. The shell interior surface 98, which may also be referred to as a cavity surface, defines a portion of one or more of the cavities 84-86 (see FIG. 2).

Referring to FIG. 6, the aperture surfaces 100 may be arranged in one or more arrays disposed along the centerline 22. The aperture surfaces 100 in each array may be arranged circumferentially around the centerline 22. Each of the aperture surfaces 100 defines a cooling aperture 104. This cooling aperture 104 extends vertically (e.g., radially) through the shell 80 from the shell exterior surface 96 to the shell interior surface 98. The cooling aperture 104 may be configured as an impingement aperture. Each aperture surface 100 of FIG. 6, for example, is adapted to direct a jet of cooling air to impinge (e.g., substantially perpendicularly) against the heat shield 82.

The aperture surfaces 102 may be arranged circumferentially around the centerline 22. Each aperture surface 102 defines an aperture 106 for receiving or otherwise mating with a respective one of the quench aperture bodies 88. Each aperture 106 extends vertically through the shell 80 from the shell exterior surface 96 to the shell interior surface 98.

Referring to FIG. 2, the heat shield 82 extends circumferentially around the centerline 22. The heat shield 82 extends axially along the centerline 22 between an axial forward end and an axial aft end. The forward end is located at (e.g., in, on, adjacent or proximate) an interface between the combustor wall 76, 78 and the bulkhead 74. The aft end may be located at an interface between the combustor wall 76, 78 and the stator vane assembly 94 or the HPT section 31A.

The heat shield 82 may include one or more heat shield panels 108 and 110, one or more of which may have an arcuate geometry. The panels 108 and 110 are respectively arranged at discrete locations along the centerline 22. The panels 108 are disposed circumferentially around the centerline 22 and form a forward hoop. The panels 110 are disposed circumferentially around the centerline 22 and form an aft hoop. Alternatively, the heat shield 82 may be configured from one or more tubular bodies.

Referring to FIGS. 4 and 5, each of the panels 110 has one or more interior surfaces 112 and 114 and an exterior surface 116. At least a portion of the panel 110 extends vertically between the interior surfaces 112 and 114 and the exterior surface 116. Each interior surface 112, which may also be referred to as a cavity surface, defines a portion of a respective one of the cooling cavities 85. Each interior surface 114, which may also be referred to as a cavity surface, defines a portion of a respective one of the cooling cavities 86. The exterior surface 116, which may also be referred to as a chamber surface, defines a portion of the combustion chamber 56.

Each panel 110 includes a panel base 118 and one or more panel rails 120-124. The panel base 118 and the panel rails 120 and 122-124 may collectively define the interior surface 112. The panel base 118 and the panel rails 121-124 may collectively define the interior surface 114. The panel base 118 may define the exterior surface 116.

The panel base 118 may be configured as a generally curved (e.g., arcuate) plate. The panel base 118 extends axially between an axial forward end 126 and an axial aft end 128. The panel base 118 extends circumferentially between opposing circumferential ends 130 and 132.

The panel rails may include one or more axial end rails 120 and 121 and one more circumferential end rails 122 and 123. The panel rails may also include at least one axial intermediate rail 124. Each of the panel rails 120-124 of the inner wall 76 extends radially in from the respective panel base 118; see FIG. 2. Each of the panel rails 120-124 of the outer wall 78 extends radially out from the respective panel base 118; see FIG. 2.

The axial end and intermediate rails 120, 121 and 124 extend circumferentially between and are connected to the circumferential end rails 122 and 123. The axial end rail 120 is arranged at (e.g., on, adjacent or proximate) the forward end 126. The axial end rail 121 is arranged at the aft end 128. The axial intermediate rail 124 is disposed axially between the axial end rails 120 and 121, for example, proximate the aft end 128. The circumferential end rail 122 is arranged at the circumferential end 130. The circumferential end rail 123 is arranged at the circumferential end 132.

Referring to FIG. 6, each panel 110 may also have one or more aperture surfaces 134 and one or more aperture surfaces 136. The aperture surfaces 134 may be respectively arranged in one or more arrays disposed along the centerline 22. The aperture surfaces 134 in each array may be disposed circumferentially around the centerline 22. Each of the aperture surfaces 134 defines a cooling aperture 138 in the panel 110 and, thus, the heat shield 82. This cooling aperture 138 may extend vertically and/or laterally (e.g., circumferentially and/or axially) through the panel base 118. The cooling aperture 138 may be configured as an effusion aperture. Each aperture surface 134 of FIG. 6, for example, is configured to direct a jet of cooling air into the combustion chamber 56 to film cool a downstream portion of the heat shield 82.

The aperture surfaces 136 may be arranged circumferentially around the centerline 22. Each aperture surface 136 may define a portion of a respective one of the quench apertures 72. More particularly, each aperture surface 136 defines an aperture that extends vertically through the respective panel 110 and, thus, the heat shield 82 from the interior surface 112 to the exterior surface 116.

Referring to FIGS. 5-7, each of the quench aperture bodies 88 is attached to (or formed integral with) a respective one of the panel bases 118. Each quench aperture body 88, for example, may be brazed, welded, adhered or otherwise bonded to the respective panel bases 118. Alternatively, in other embodiments, one or more of the quench aperture bodies 88 may each be attached to or formed integral with the shell 80.

Referring still to FIGS. 5-7, one or more of the quench aperture bodies 88 are located laterally within and extend vertically through a respective one of the cooling cavities 85. One or more of the quench aperture bodies 88, for example, may be arranged circumferentially between the circumferential end rails 122 and 123 of a respective one of the panels 110. One or more of the quench aperture bodies 88 may be arranged axially between the axial end and intermediate rails 120 and 124 of a respective one of the panels 110.

Each quench aperture body 88 has an interior surface 140, an exterior surface 142, an inner surface 144 and an outer surface 146. The quench aperture body 88 extends vertically from the interior surface 140 to the exterior surface 142, where the interior surface 140 is engaged with (e.g., contacts) the interior surface 112. The quench aperture body 88 extends laterally between the inner surface 144 and the outer surface 146.

The exterior surface 142 may be funnel-shaped with a curved sectional geometry. With this configuration, the inner surface 144 as well as the exterior surface 142 define a portion of a respective one of the quench apertures 72. More particularly, the exterior surface 142 and the inner surface 144 define an aperture that extends vertically through the respective quench aperture body 88 to the interior surface 140.

Figure 18:
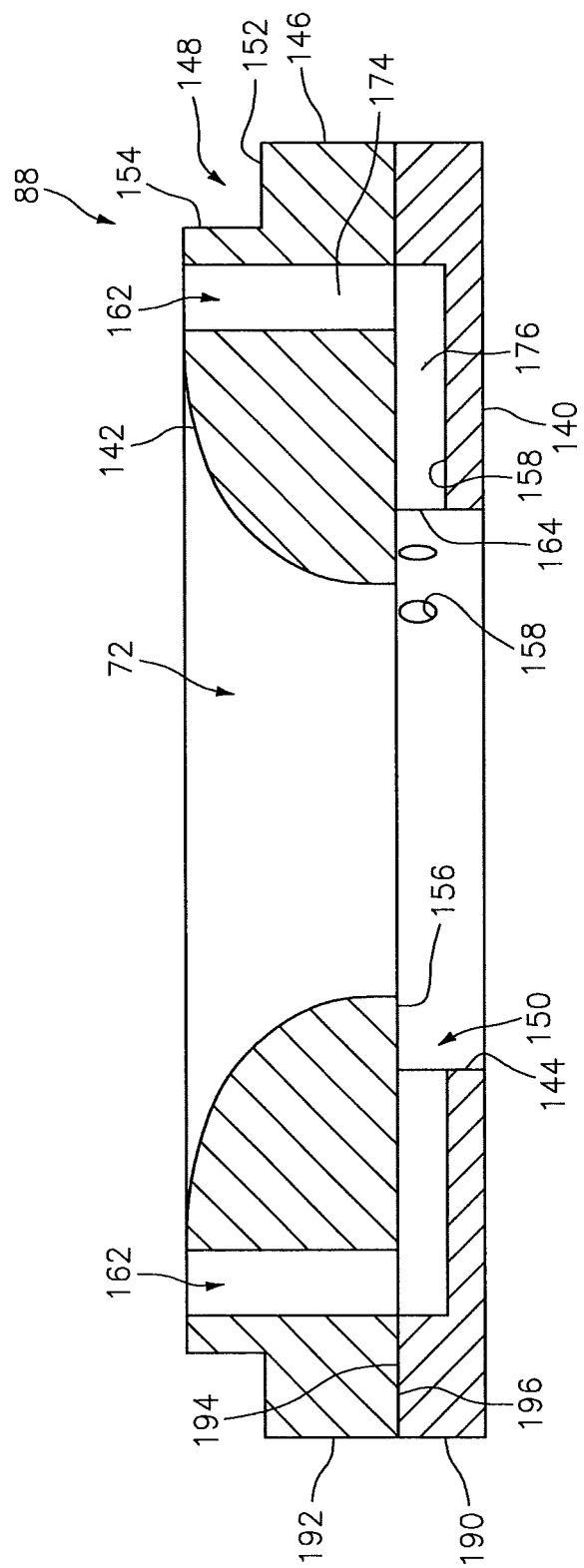
FIG. 18 is a detailed side sectional illustration of an alternate embodiment annular body.

Each quench aperture body 88 may define an annular peripheral outer channel 148 and/or an annular peripheral inner channel 150 (see also FIG. 18). The outer channel 148 extends vertically into the quench aperture body 88 from the exterior surface 142 to a first outer channel surface 152 (e.g., a shelf surface). The outer channel 148 extends laterally into the quench aperture body 88 from the outer surface 146 to a second outer channel surface 154, which may be substantially perpendicular to the first outer channel surface 152. A width (e.g., a diameter) of the second outer channel surface 154 may be substantially equal to (or less than) a lateral width (e.g., a diameter) of a respective one of the aperture surfaces 102.

The inner channel 150 extends vertically into the quench aperture body 88 from the interior surface 140 to a first inner channel surface 156. The inner channel 150 extends laterally into the quench aperture body 88 from the exterior surface 142 to a second inner channel surface (e.g., the inner surface 144), which may be substantially perpendicular to the first inner channel surface 156. A lateral width (e.g., a diameter) of the inner surface 144 may be substantially equal to (or less than) a lateral width (e.g., a diameter) of a respective one of the aperture surfaces 136.

Each quench aperture body 88 may also have one or more aperture surfaces 158. Each of the aperture surfaces 158 defines a cooling aperture 162 in the respective quench aperture body 88. This cooling aperture 162 extends through the quench aperture body 88 from an inlet in the exterior surface 142 to an outlet 164 in the inner surface 144.

The cooling apertures 162 and the outlets 164 may be non-uniformly distributed around a centerline 166 of a respective one of the quench apertures 72. The outlets 164 of FIG. 7, for example, are arranged in a plurality of groupings 168. Adjacent outlets 164 within each grouping 168 may be separated by an intra-group distance 170. Adjacent outlets 164 in adjacent groupings 168, in contrast, may be separated by an inter-group distance 172 that is greater (or less) than the intra-group distance 170. With such a non-uniform distribution, the respective quench aperture body 88 may be non-uniformly cooled as described below in further detail. The present invention, however, is not limited to the specific non-uniform cooling aperture outlet distribution described above. Furthermore, in other embodiments, the cooling aperture outlets 164 may be uniformly distributed around the centerline as described below in further detail.

Referring to FIGS. 6 and 7, the quench aperture body 88 may define each cooling aperture 162 with an inlet portion 174 at (e.g., in, adjacent or proximate) the exterior surface 142 and an outlet portion 176 at the inner surface 144. The inlet portion 174 may extend substantially vertically (e.g., without a lateral component) from the inlet in the exterior surface 142 to (or towards) the outlet portion 176. The outlet portion 176 may extend substantially laterally (e.g., without a vertical component) from the outlet 164 in the inner surface 144 to (or towards) the inlet portion 174. Of course, in other embodiments, the inlet portion 174 may also extend laterally and/or the outlet portion 176 may also extend vertically.

Figure 8:
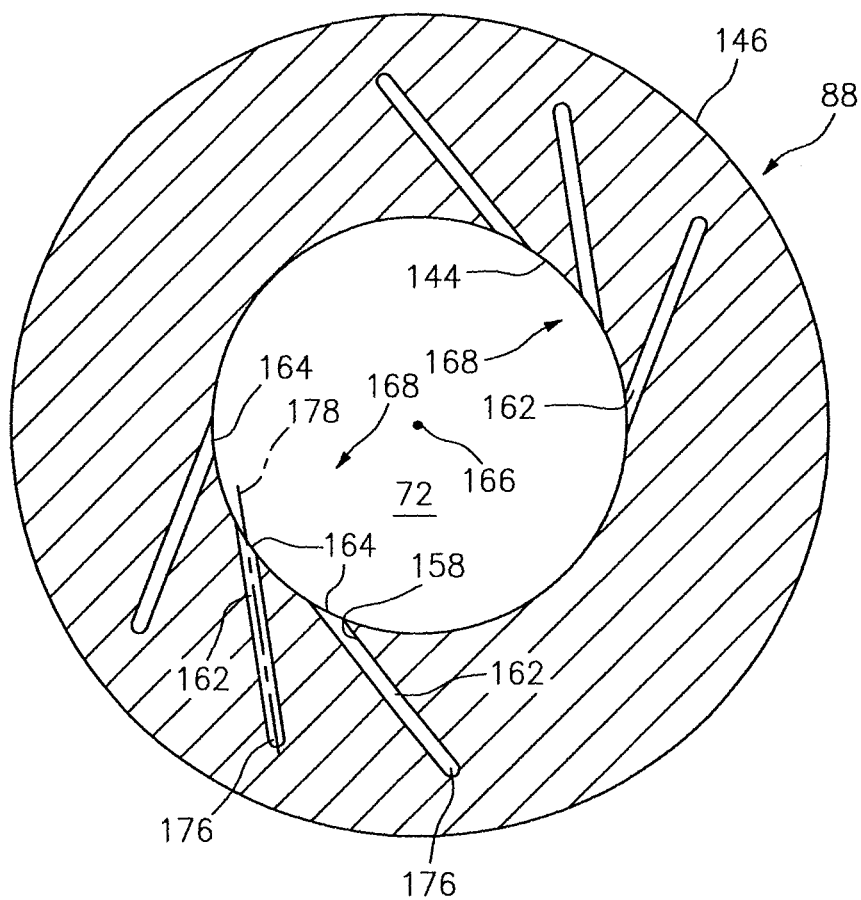
FIGS. 8-12 are detailed circumferential illustrations of alternate embodiment annular bodies.

Referring to FIGS. 7 and 8, the outlet portion 176 of one or more of the cooling apertures 162 may extend along a substantially straight centerline 178 through the quench aperture body 88. Each outlet portion 176 of FIG. 7, for example, extends substantially radially relative to the centerline 166; e.g., the centerline 178 may be a ray of the centerline 166. In another example, each outlet portion 176 of FIG. 8 extends substantially tangentially relative to the inner surface 144. In other embodiments, of course, the centerline 178 of each outlet portion 176 may follow a substantially straight trajectory other than those described above and illustrated in the drawings; e.g., the centerline 178 may be acutely offset from the inner surface 144 by between about fifteen degrees (15°) and about eighty-five degrees (85°). The present invention, of course, is not limited to the foregoing angular examples.

Figure 9:
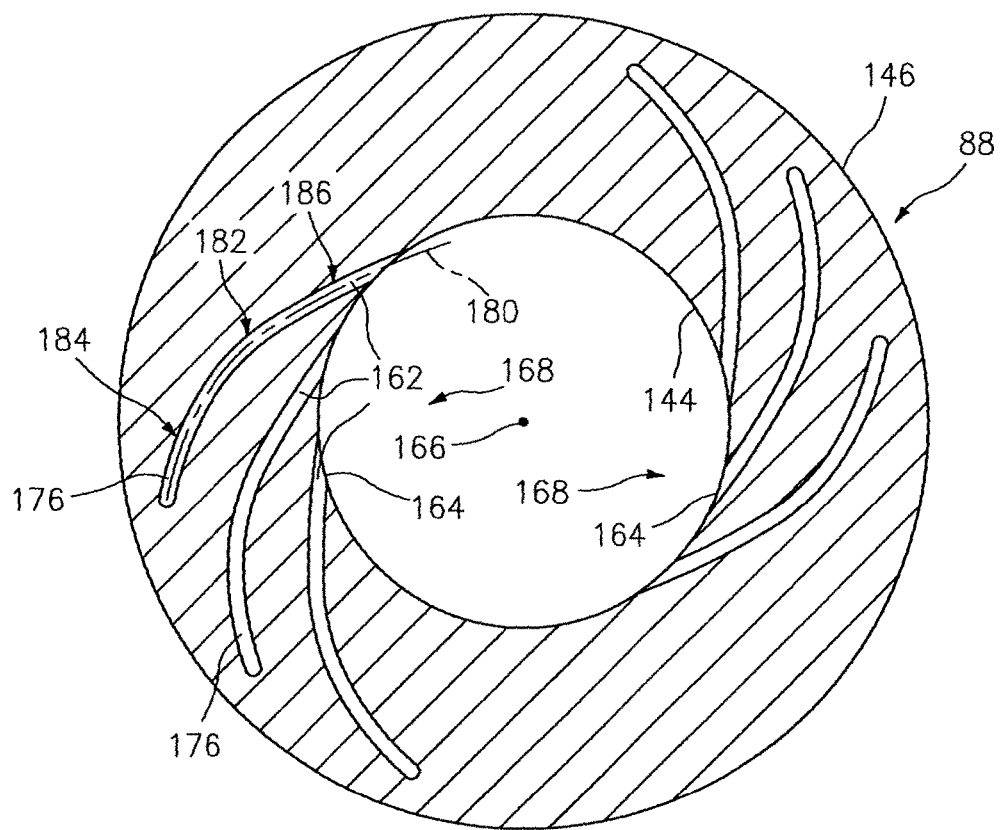

Alternatively, referring to FIG. 9, the outlet portion 176 of one or more of the cooling apertures 162 may each extend along a curved and/or compound centerline 180. Each outlet portion 176 of FIG. 9, for example, generally spirals partially (or completely) around the centerline 166. Each outlet portion 176 may include one or more sub-portions such as, for example, a curved intermediate sub-portion 182 between a pair of straight sub-portions 184 and 186. The sub-portion 184 extends from the sub-portion 182 to (or towards) the inlet portion 174 (see FIG. 6). The sub-portion 186 extends substantially tangentially to the inner surface 144. In other embodiments, however, the sub-portion 186 may extend substantially radially relative to the centerline 166 or the centerline 180 of the sub-portion 186 may be acutely offset from the inner surface 144. In addition, in other embodiments, one or more of the sub-portions 184 and 186 may each be curved and/or the sub-portion 182 may be straight.

Referring to FIG. 2, the heat shield 82 of the inner wall 76 circumscribes the shell 80 of the inner wall 76, and defines an inner side of the combustion chamber 56. The heat shield 82 of the outer wall 78 is arranged radially within the shell 80 of the outer wall 78, and defines an outer side of the combustion chamber 56 that is opposite the inner side.

Referring now to FIG. 6, each quench aperture body 88 is (e.g., axially and circumferentially) aligned and mated with a respective one of the apertures 106. A portion of the shell 80 that includes a respective one of the aperture surfaces 102, for example, is seated within the outer channel 148 vertically against the first outer channel surface 152; e.g., the shelf surface. In this manner, the respective quench aperture body 88 may form a seal with the shell interior surface 98 and, thus, the shell 80.

Referring to FIG. 2, the heat shield 82 and, more particularly, each of the panels 108 and 110 may be respectively attached to the shell 80 by a plurality of mechanical attachments 188; e.g., threaded studs respectively mated with washers and nuts. The shell 80 and the heat shield 82 thereby respectively form the cooling cavities 84-86 in each combustor wall 76, 78.

Referring to FIGS. 4-6, each cooling cavity 85 is defined and extends vertically between the interior surface 98 and a respective one of the interior surfaces 112 as set forth above. Each cooling cavity 85 is defined and extends circumferentially between the circumferential end rails 122 and 123 of a respective one of the panels 110. Each cooling cavity 85 is defined and extends axially between the axial end and intermediate rails 120 and 124 of a respective one of the panels 110. In this manner, each cooling cavity 85 may fluidly couple one or more of the cooling apertures 104 in the shell 80 with one or more of the cooling apertures 138 in the heat shield 82.

During turbine engine operation, core air from the plenum 64 is directed into each cooling cavity 85 through respective cooling apertures 104. This core air (e.g., cooling air) may impinge against the respective panel base 118, thereby impingement cooling the panel 110 and the heat shield 82. The cooling air within each cooling cavity 85 is subsequently directed through the cooling apertures 138 into the combustion chamber 56 to film cool a downstream portion of the heat shield 82. Within each cooling aperture 138, the cooling air may also cool the heat shield 82 through convective heat transfer.

In addition, core air from the plenum 64 is also directed into each cooling aperture 162. For example, the flow of the core air (e.g., quench air) vertically through the quench aperture 72 from the plenum 64 and into the combustion chamber 56 may create a relatively low pressure zone within the inner channel 150 and, thus, a pressure drop across the cooling apertures 162. This pressure drop may force the core air through the cooling apertures 162 and into the quench apertures 72.

Within the cooling aperture 162, the core air (e.g., cooling air) may cool the respective quench aperture body 88 through convective heat transfer. The cooling apertures 162 of FIGS. 8 and 9 may also direct the cooling air into each quench aperture 72 in a manner that film cools the respective inner surface 144 and/or induces vortices that may increase convective heat transfer within the quench aperture 72. The cooling apertures 162 of FIGS. 7-9 therefore are operable to reduce the temperature of and, thus, thermally induced stresses within the respective quench aperture body 88.

Under certain conditions, flow dynamics of the quench air mixing with the core air may subject each quench aperture body 88 to non-uniform thermal gradients. These non-uniform thermal gradients, however, may be reduced or substantially normalized by the non-uniform cooling aperture outlet 164 distribution described above. The groupings 168, for example, may be aligned with portions of the respective quench aperture body 88 that are subjected to relatively high thermal gradients. The gaps between the groupings 168, in contrast, may be aligned with portions of the respective quench aperture body 88 that are subjected to relatively low thermal gradients. The non-uniform cooling aperture outlet 164 distribution therefore may further reduce thermally induced stresses within the respective quench aperture body 88.

It is worth noting the non-uniform cooling of a respective quench aperture body 88 may be further tailored (e.g., see FIGS. 10 and 11) or alternatively implemented (e.g., see FIG. 12) by defining some or all of the cooling apertures 162 in the body 88 with different configurations. The cooling aperture configurations may be varied by varying, for example, one or more of the following cooling aperture characteristics:
- a geometry (e.g., shape) of a path of the cooling aperture 162 through the body 88;
- a length of the cooling aperture 162 and, thus, its path through the body 88;
- a width (e.g., diameter) of the cooling aperture 162 within the body 88;
- a geometry of a cross-section of the cooling aperture 162 within the body 88;
- a location of the inlet of the cooling aperture 162; and
- a location of the outlet 164 of the cooling aperture 162.

The cooling aperture configurations, of course, may also or alternatively be varied by varying one or more cooling aperture characteristics other than those described above.

Figure 10:
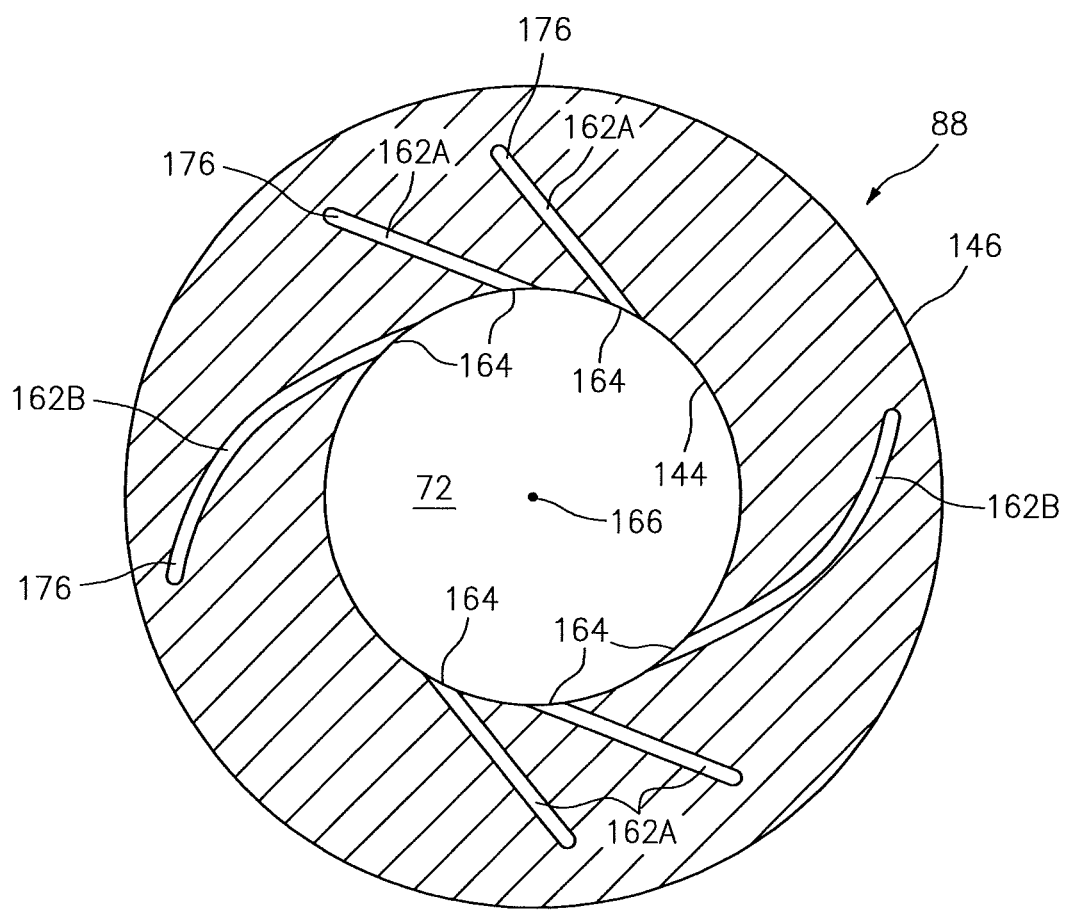
Figure 11:
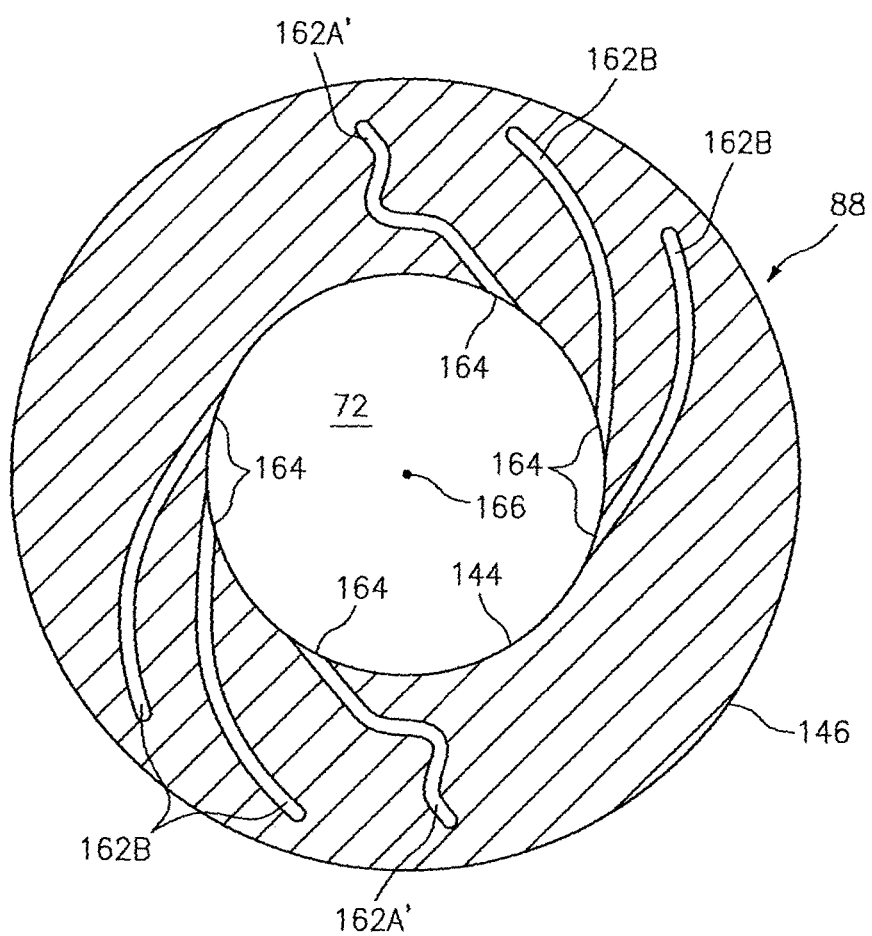

In the embodiment of FIG. 10, the quench aperture body 88 defines each cooling aperture 162A with a first configuration and defines each cooling aperture 162B with a second configuration to further tailor the non-uniform body 88 cooling. The path of each cooling aperture 162A, for example, is configured with a substantially straight lateral geometry. In contrast, the path of each cooling aperture 162B is configured with a curved lateral geometry. This curved lateral geometry may increase the length (e.g., distance between the inlet and the outlet) of each cooling aperture 162B through the body 88 and thereby enable the cooling air flowing therethrough to receive additional thermal energy. In this manner, the cooling air may cool the portions of the quench aperture body 88 surrounding and defining the cooling apertures 162B more than those portions surrounding and defining the cooling apertures 162A. Of course, in other embodiments as illustrated in FIG. 11, the cooling apertures 162A' and 162B may have different path geometries but substantially equal lengths.

Figure 12:
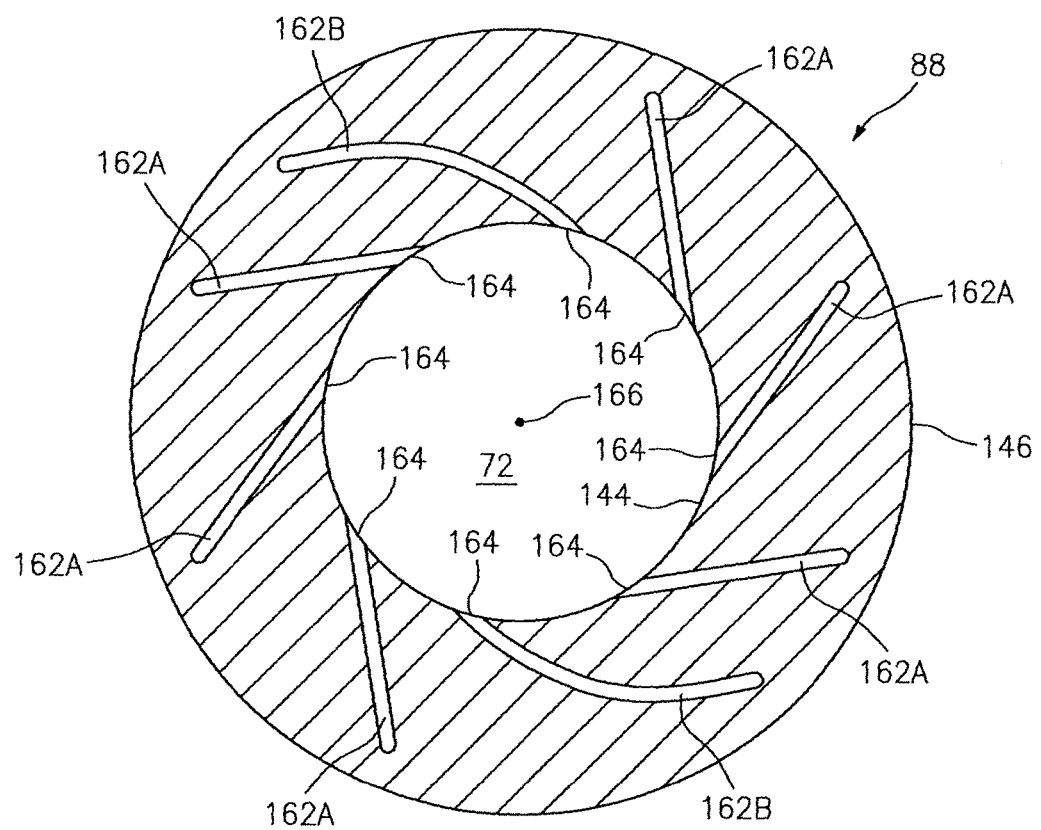
Figure 13:
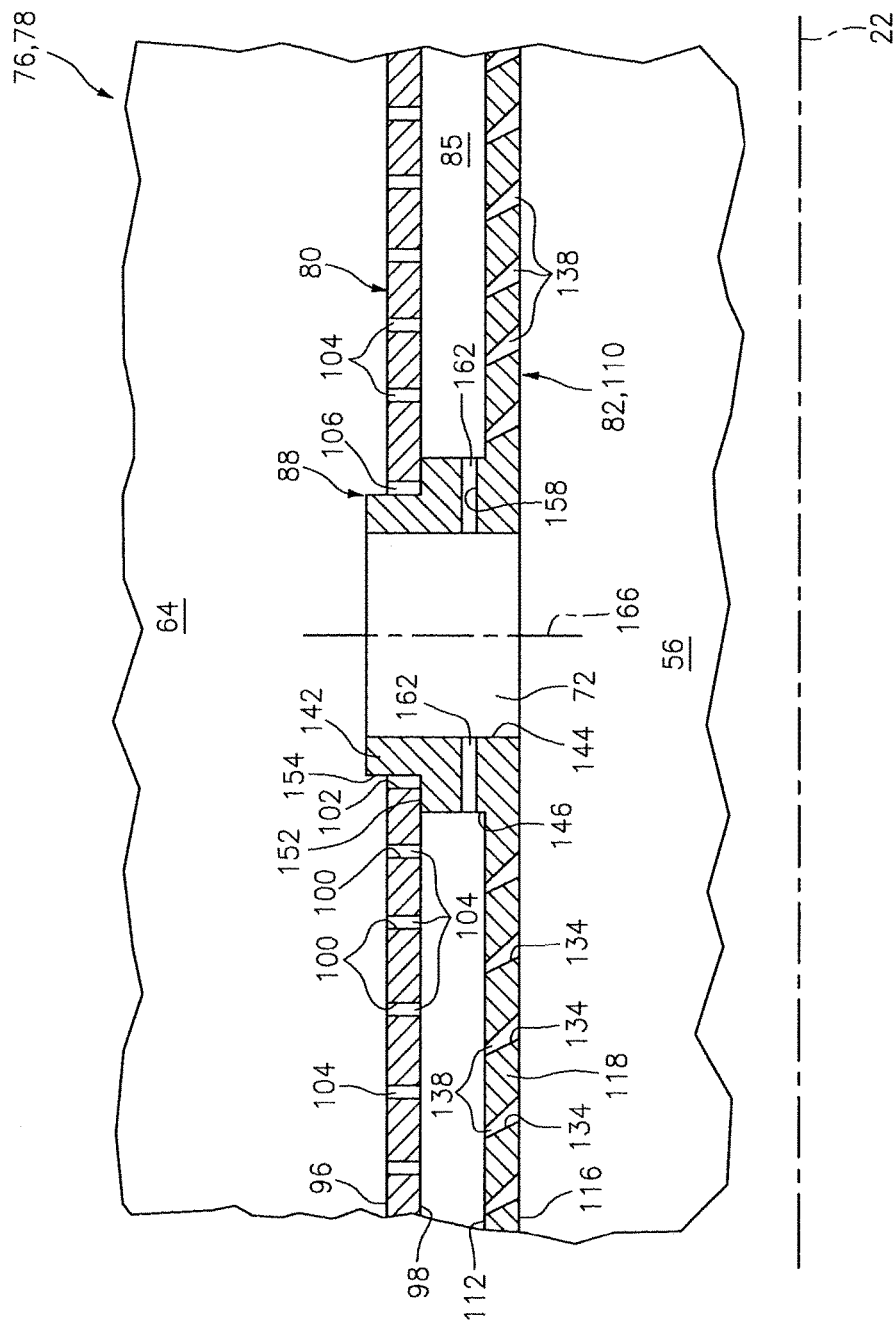
FIGS. 13 and 14 are detailed side sectional illustrations of respective portions of alternate embodiment combustor walls.

In the embodiment of FIG. 12, the quench aperture body 88 defines each cooling aperture 162A with a first configuration and defines each cooling aperture 162B with a second configuration to alternatively implement the non-uniform body 88 cooling. For example, similar to the embodiment of FIG. 10, the path of each cooling aperture 162A is configured with a substantially straight lateral geometry and the path of each cooling aperture 162B is configured with a curved lateral geometry. In contrast to the embodiments described above, however, the cooling aperture outlets 164 are substantially uniformly distributed around the centerline 166. Substantially the entire quench aperture body 88 therefore is generally cooled, while the portions of the body 88 surrounding and defining the cooling apertures 162B receive additional cooling.

Figure 17:
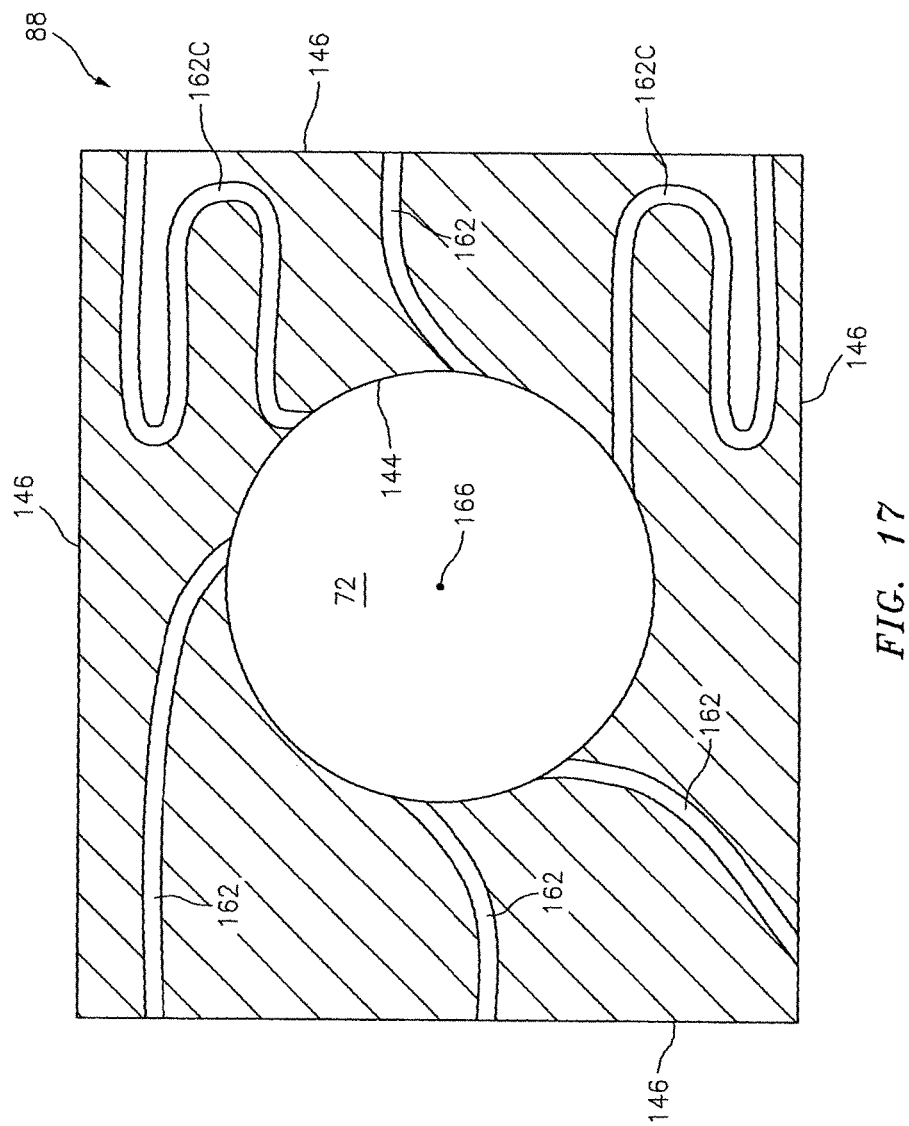

One or more of the cooling apertures 162 may each have various configurations other than those described above. For example, referring to FIGS. 13-17, one or more of the cooling apertures 162 may each extend laterally through the body 88 between the inner and the outer surfaces 144 and 146. In this manner, the cooling apertures 162 direct the cooling air from the cooling cavity 85 into a respective one of the quench apertures 72. Referring to FIG. 17, the cooling apertures 162 may be asymmetrically distributed around the centerline 166. One or more of the cooling apertures (e.g., apertures 162C) may each have a tortuous path geometry; e.g., a parti-serpentine geometry, a zigzag geometry, an overlapping geometry, etc. In addition, it should be noted that the cooling aperture configurations described above with the inlets in the exterior surface 142 may also be applied to those with the inlets in the outer surface 146, and vice versa.

Figure 14:
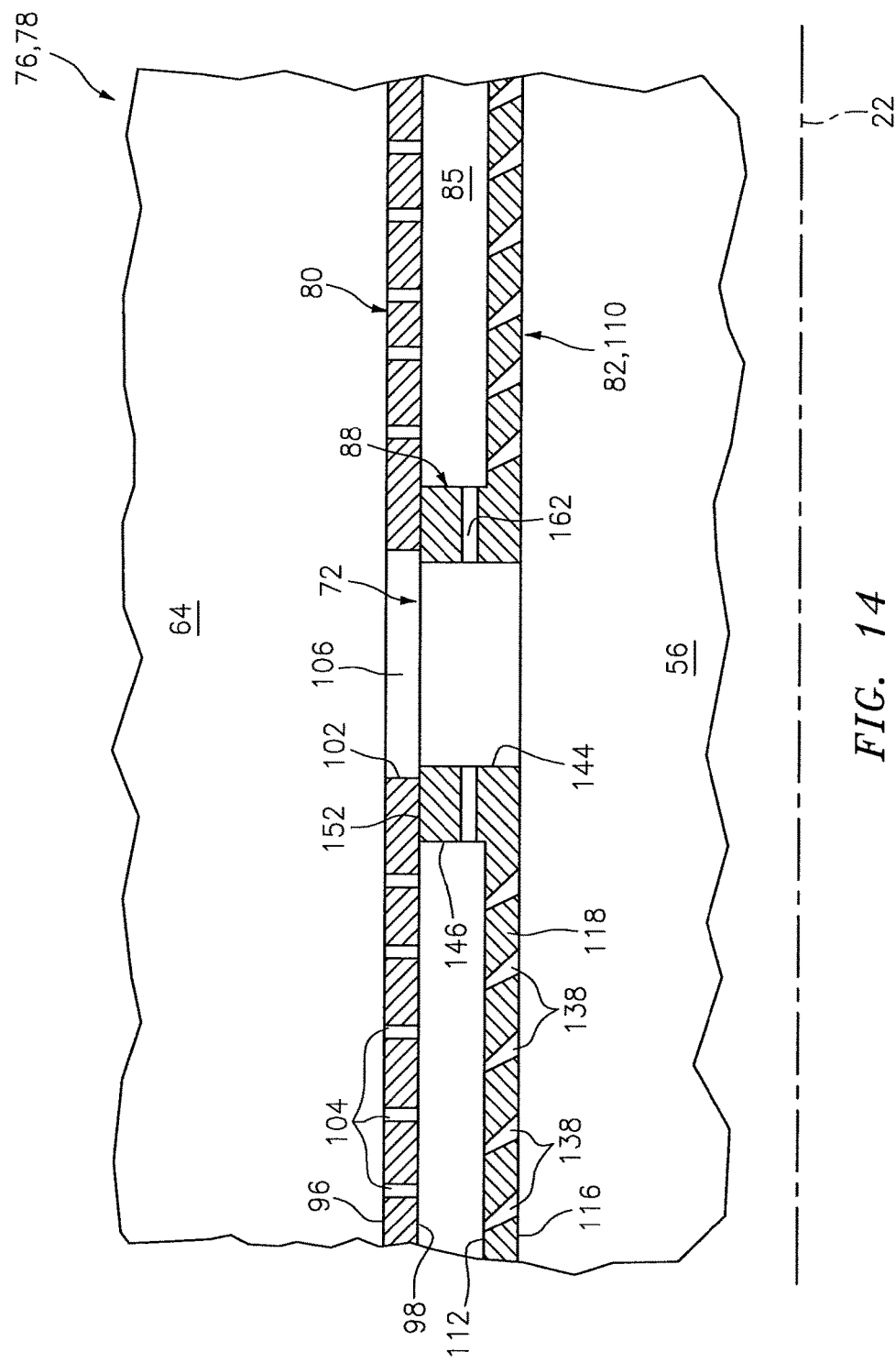
Figure 15:
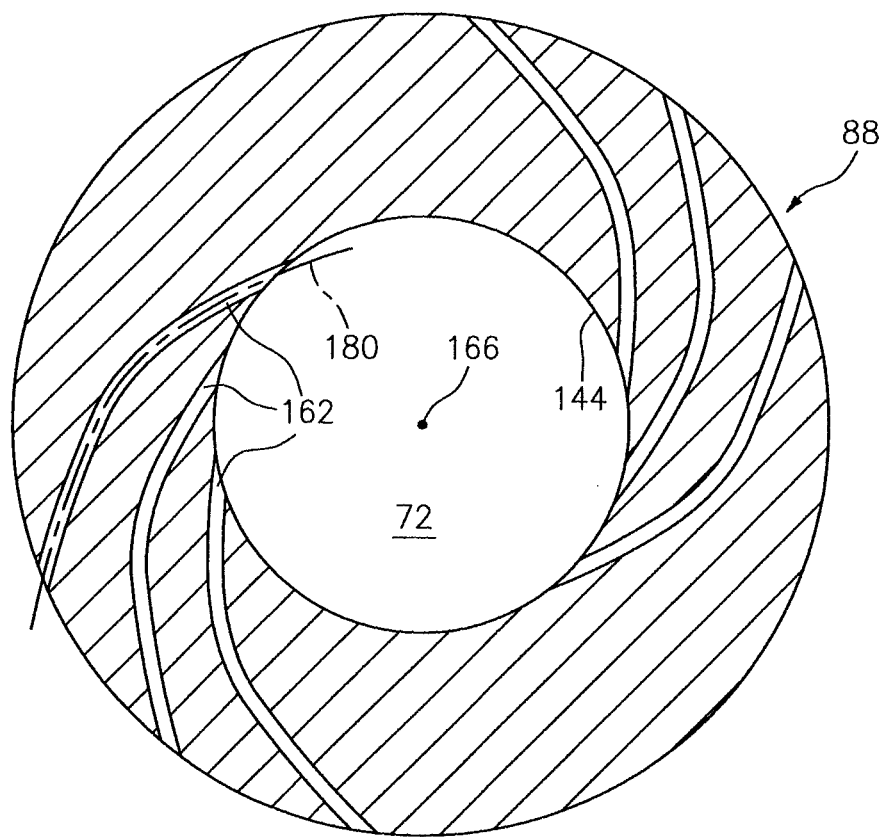
FIGS. 15-17 are detailed circumferential illustrations of alternate embodiment annular bodies.
Figure 16:
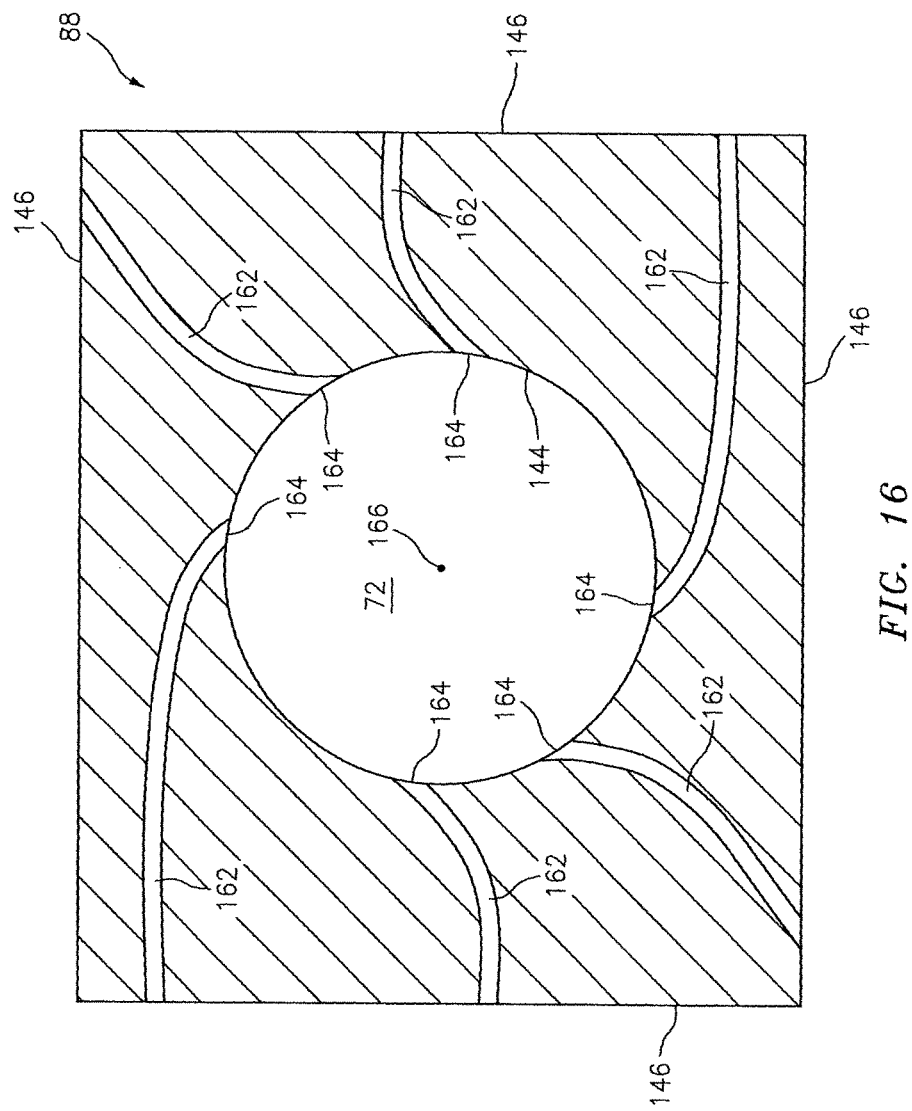

One or more of the quench aperture bodies 88 may each have various configurations other than those described above. For example, referring to FIG. 13, the inner surface 144 may substantially define the respective quench aperture 72 through the shell 80 and the heat shield 82. Referring to FIG. 14, the surfaces 102 and 144 may collectively define the respective quench aperture 72. Referring to FIGS. 6 and 7, each of the surfaces 102, 136, 142, 144, 146 and 154 may have a circular cross-section. Alternatively, one or more of the surfaces 102, 136, 142, 144, 146 and 154 may each have a non-circular cross-section. Examples of a non-circular cross-section include, but are not limited to, an oval cross-section, an elliptical cross-section, a pear-shaped cross-section, a teardrop cross-section, a polygonal (e.g., rectangular, triangular, etc.) cross-section, or any other symmetric or asymmetric shaped cross-section with, for example, its major axis aligned (e.g., parallel) with the centerline 22. For example, referring to FIGS. 16 and 17, the inner surface 144 may have a circular cross-section whereas the outer surface 146 may have a rectangular cross-section. Alternatively, the cross-section of one or more of the foregoing surfaces may each be any geometry obtained from an overlap or connection of any of the previously described shapes.

In some embodiments, referring to FIG. 6, one or more of the quench aperture bodies 88 may each be formed as a unitary body. Each quench aperture body 88, for example, may be cast or additively manufactured as a single unit and/or machined from a single billet of material. Alternatively, referring to FIG. 18, one or more of the quench aperture bodies 88 may each be configured with a plurality of discrete annular body segments 190 and 192 that are attached (e.g., bonded and/or mechanically fastened) to one another. The first segment 190, for example, may extend vertically from the interior surface 140 to a first mating surface 194. The second segment 192 may extend vertically from the exterior surface 142 to a second mating surface 196, which may also form the first inner channel surface 156. The first mating surface 194 may be brazed or otherwise bonded to the second mating surface 196 to provide the respective quench aperture body 88. Of course, in other embodiments, one or more of the quench aperture bodies 88 may each be configured with additional or alternative vertical and/or lateral body segments.

In some embodiments, one or more of the bodies 88 may alternatively be configured to define other types of apertures through one or more of the combustor walls 76 and 78. For example, at least one of the bodies 88 may define an aperture that receives a respective one of the igniters. In another example, at least one of the bodies 88 may define an aperture that may receive a borescope during combustor maintenance and/or inspection.

The terms "forward", "aft", "inner", "outer", "radial", "circumferential" and "axial" are used to orientate the components of the turbine engine assembly 60 and the combustor 62 described above relative to the turbine engine 20 and its centerline 22. One or more of these turbine engine components, however, may be utilized in other orientations than those described above. The present invention therefore is not limited to any particular spatial orientations.

The turbine engine assembly 60 may be included in various turbine engines other than the one described above. The turbine engine assembly 60, for example, may be included in a geared turbine engine where a gear train connects one or more shafts to one or more rotors in a fan section, a compressor section and/or any other engine section. Alternatively, the turbine engine assembly 60 may be included in a turbine engine configured without a gear train. The turbine engine assembly 60 may be included in a geared or non-geared turbine engine configured with a single spool, with two spools (e.g., see FIG. 1), or with more than two spools. The turbine engine may be configured as a turbofan engine, a turbojet engine, a propfan engine, or any other type of turbine engine. The present invention therefore is not limited to any particular types or configurations of turbine engines.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. An assembly for a turbine engine, the assembly comprising:
   a combustor wall including a shell, a heat shield and an annular body having an inner surface that at least partially defines a first aperture through the shell and the heat shield;
   wherein the annular body further defines a plurality of second apertures through which air is directed into the first aperture and provides non-uniform cooling to the annular body;
   wherein the annular body defines each of the second apertures with a respective path that extends from a respective inlet to a respective outlet with a respective trajectory through the annular body;
   wherein the respective outlets of the second apertures are arranged in axial alignment on the inner surface of the annular body relative to a centerline of the first aperture;
   and wherein a geometry of the trajectory of the path of one of the second apertures is different than a geometry of the trajectory of the path of another one of the second apertures.

2. The assembly of claim 1, wherein
   the annular body defines each of the second apertures with a respective length therethrough; and
   the length of one of the second apertures is different than the length of another one of the second apertures.

3. The assembly of claim 1, wherein
   the annular body defines each of the second apertures with a respective width therewithin; and
   the width of one of the second apertures is different than the width of another one of the second apertures.

4. The assembly of claim 1, wherein
   the respective outlets of the second apertures are disposed around and fluidly coupled with the first aperture;
   a first of the outlets is between and adjacent to a second and a third of the outlets; and
   a distance between the first and the second of the outlets is different than a distance between the first and the third of the outlets.

5. The assembly of claim 1, wherein at least a portion of one of the plurality of second apertures at the inner surface extends substantially radially relative to the centerline of the first aperture.

6. The assembly of claim 1, wherein at least a portion of one of the plurality of second apertures at the inner surface extends substantially tangentially relatively to the inner surface.

7. The assembly of claim 1, wherein at least a portion of one of the plurality of second apertures at the inner surface extends acutely relative to the inner surface.

8. The assembly of claim 1, wherein the annular body extends laterally between an outer surface and the inner surface; and one of the plurality of second apertures extends through the annular body between the outer surface and the inner surface.

9. The assembly of claim 1, wherein the annular body extends vertically to an exterior surface and laterally to the inner surface; and one of the plurality of second apertures extends through the annular body between the exterior surface and the inner surface.

10. The assembly of claim 9, wherein the exterior surface is funnel-shaped and defines a portion of the first aperture.

11. The assembly of claim 1, wherein the annular body includes a shelf surface and the inner; and the shelf surface and the inner surface define a peripheral inner channel in the annular body.

12. The assembly of claim 1, wherein
the annular body extends vertically through a cooling cavity that is defined vertically between the shell and the heat shield; and
the cooling cavity fluidly couples one or more shell cooling apertures defined in the shell with one or more heat shield cooling apertures defined in the heat shield.

13. The assembly of claim 1, wherein the heat shield includes a plurality of panels that are attached to the shell, and the annular body is connected to one of the panels.

14. A grommet for a turbine engine combustor wall through which a quench aperture vertically extends, the grommet comprising:
an annular body extending vertically between interior and exterior surfaces and laterally between an inner surface and an outer surface, the inner surface at least partially defining the quench aperture;
wherein the annular body defines a plurality of cooling apertures to direct air into the quench aperture that extend through the annular body from respective inlets to respective outlets in the inner surface with a respective trajectory, wherein the outlets are axially aligned relative to a centerline of the quench aperture;
and wherein the annular body defines a first of the plurality of cooling apertures with a different trajectory geometry than that of a second of the plurality of cooling apertures.

15. The grommet of claim 14, wherein
the annular body defines each of the cooling apertures with a respective length therethrough; and
the length of the first of the cooling apertures is different than the length of the second of the cooling apertures.

16. The grommet of claim 14, wherein the annular body is operable to direct air through the cooling apertures to non-uniformly cool the annular body.

17. A grommet for a turbine engine combustor wall through which a quench aperture vertically extends, the grommet comprising:
an annular body extending vertically between interior and exterior surfaces and laterally between an inner surface and an outer surface, the inner surface at least partially defining the quench aperture;
wherein the annular body defines a plurality of cooling apertures to direct air into the quench aperture that respectively extend through the annular body from a plurality of respective inlets to a plurality of respective outlets in the inner surface with a respective trajectory;
wherein the outlets are disposed in axial alignment around the quench aperture relative to a centerline of the quench aperture;
wherein the annular body defines a first of the plurality of cooling apertures with a different trajectory geometry than that of a second of the plurality of cooling apertures;
and wherein a first of the outlets is between and adjacent to a second and a third of the outlets, and a distance between the first and the second of the outlets is different than a distance between the first and the third of the outlets.

18. The grommet of claim 17, wherein the annular body is operable to direct air through the cooling apertures to non-uniformly cool the annular body.

\* \* \* \* \*